United States Patent
Chun et al.

(10) Patent No.: US 9,420,571 B2
(45) Date of Patent: Aug. 16, 2016

(54) METHOD AND APPARATUS FOR TRANSMITTING AND RECEIVING SIGNAL TO AND FROM NETWORK AT USER EQUIPMENT IN A WIRELESS COMMUNICATION SYSTEM

(75) Inventors: Sungduck Chun, Gyeonggi-do (KR); Sunghoon Jung, Gyeonggi-do (KR); Seungjune Yi, Anyang-si (KR); Youngdae Lee, Gyeonggi-do (KR); Sungjun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 198 days.

(21) Appl. No.: 14/344,978

(22) PCT Filed: Sep. 5, 2012

(86) PCT No.: PCT/KR2012/007098
§ 371 (c)(1),
(2), (4) Date: Oct. 8, 2014

(87) PCT Pub. No.: WO2013/042885
PCT Pub. Date: Mar. 28, 2013

(65) Prior Publication Data
US 2015/0071260 A1 Mar. 12, 2015

Related U.S. Application Data

(60) Provisional application No. 61/610,451, filed on Mar. 13, 2012, provisional application No. 61/541,100, filed on Sep. 30, 2011, provisional application No. 61/538,146, filed on Sep. 23, 2011.

(51) Int. Cl.
*H04L 1/00* (2006.01)
*H04W 72/04* (2009.01)
*H04L 1/18* (2006.01)
*H04L 5/00* (2006.01)

(52) U.S. Cl.
CPC ......... *H04W 72/0413* (2013.01); *H04L 1/1848* (2013.01); *H04L 1/1854* (2013.01); *H04L 5/0055* (2013.01); *H04W 72/0446* (2013.01)

(58) Field of Classification Search
CPC .................. H04J 3/14; H04J 3/15; H04J 3/16; H04J 3/17; H04J 3/18; H04W 72/04; H04W 72/05; H04W 72/06
USPC .................. 370/241, 252, 315–329, 331–338
See application file for complete search history.

(56) References Cited

U.S. PATENT DOCUMENTS

| | | | |
|---|---|---|---|
| 2010/0265896 A1* | 10/2010 | Park | H04W 72/0413 370/329 |
| 2011/0085509 A1 | 4/2011 | Park et al. | |
| 2013/0100939 A1* | 4/2013 | Kim | H04L 1/1685 370/336 |

FOREIGN PATENT DOCUMENTS

WO    2010/128927 A1    11/2010

OTHER PUBLICATIONS

International Search Report and Written Opinion issued in corresponding International Patent Application No. PCT/KR2012/007098 dated Feb. 27, 2013.
LG Electronics Inc., BSR and UL grant in Msg2, 3GPP TSG-RAN2 Meeting #74, R2-113250, May 9-13, 2011.
LG Electronics Inc., BSR and UL grant in Msg2, 3GPP TSG-RAN2 Meeting #74, R2-113252, May 9-13, 2011.

* cited by examiner

*Primary Examiner* — Dady Chery
(74) *Attorney, Agent, or Firm* — Morgan, Lewis & Bockius LLP

(57) ABSTRACT

A method for transmitting a signal to a transmitter at a receiver in a wireless communication system is disclosed. The method includes receiving first information to be transmitted to the transmitter from a higher layer and activating a timer, receiving second information to be transmitted to the transmitter from the higher layer, and transmitting a resource allocation request message to the transmitter, for transmitting the first and second information, upon expiration of the timer.

14 Claims, 11 Drawing Sheets

(a) Control-plane protocol stack (b) User-plane protocol stack

METHOD AND APPARATUS FOR TRANSMITTING AND RECEIVING SIGNAL TO AND FROM NETWORK AT USER EQUIPMENT IN A WIRELESS COMMUNICATION SYSTEM

TECHNICAL FIELD

The present invention relates to a wireless communication system, and more particularly, to a method and apparatus for transmitting and receiving a signal to and from a network at a User Equipment (UE) in a wireless communication system.

BACKGROUND ART

A brief description will be given of a 3rd Generation Partnership Project (3GPP) Long Term Evolution (LTE) system as an example of a wireless communication system to which the present invention can be applied.

FIG. 1 illustrates the configuration of an Evolved Universal Mobile Telecommunications System (E-UMTS) network as an exemplary wireless communication system. The E-UMTS system is an evolution of the legacy UMTS system and the 3GPP is working on standardization of E-UMTS. E-UMTS is also called an LTE system. For details of the technical specifications of UMTS and E-UMTS, refer to "3rd Generation Partnership Project; Technical Specification Group Radio Access Network" Release 7 and Release 8, respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides Downlink (DL) or Uplink (UL) transmission service to a plurality of UEs in the bandwidth. Different cells may be configured so as to provide different bandwidths. The eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectations of users and service providers are on the increase. Considering other radio access technologies under development, new technological evolutions are required to achieve future competitiveness. Specifically, cost reduction per bit, increased service availability, flexible use of frequency bands, a simplified structure, an open interface, appropriate power consumption of UEs, etc. are required.

DISCLOSURE OF INVENTION

Technical Problem

An object of the present invention devised to solve the problem lies on a method and apparatus for transmitting and receiving a signal to and from a network at a UE in a wireless communication system.

Solution to Problem

The object of the present invention can be achieved by providing a method for transmitting a signal to a transmitter at a receiver in a wireless communication system, including receiving first information to be transmitted to the transmitter from a higher layer and activating a timer, receiving second information to be transmitted to the transmitter from the higher layer, and transmitting a resource allocation request message to the transmitter, for transmitting the first and second information, upon expiration of the timer.

The method may further include receiving information about the timer from the transmitter.

The resource allocation request message may include a buffer status report message or a scheduling request message transmitted on an uplink physical control channel.

The first and second information may be related to a predetermined radio bearer or a predetermined logical channel. In this case, the method may further include receiving information about the predetermined radio bearer or the predetermined logical channel from the transmitter.

The first information may be a Radio Link Control (RLC) status data unit and the second information may be an RLC data unit. In this case, the RLC status data unit may include ACKnowledgment/Negative ACKnowledgment (ACK/NACK) information for an RLC data unit received from the transmitter.

The method may further include transmitting the first information and the second information together or separately to the transmitter.

Advantageous Effects of Invention

According to the embodiments of the present invention, radio resources can be effectively allocated in various traffic situations.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system.

Figure 1:
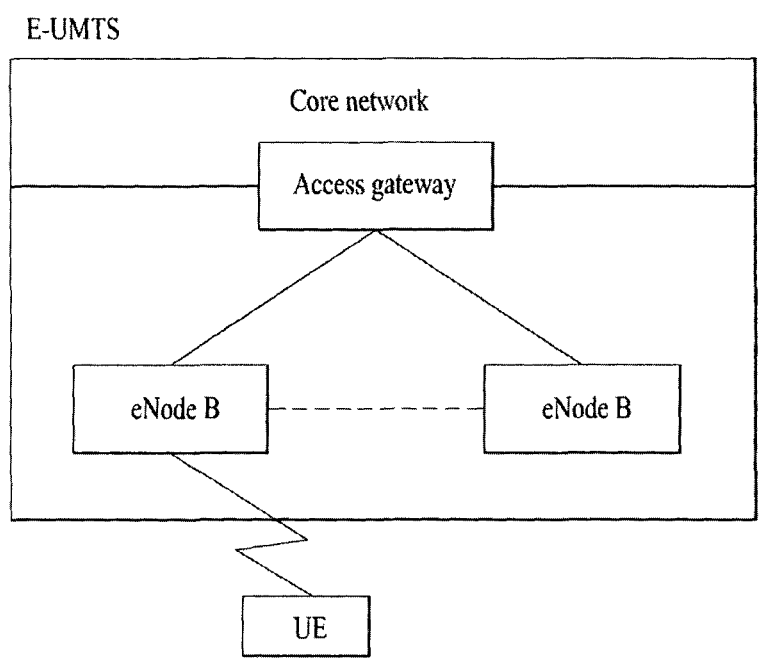
FIG. 1 illustrates the configuration of an Evolved Universal Mobile Telecommunications System (E-UMTS) network as an example of a wireless communication system.
Figure 2:
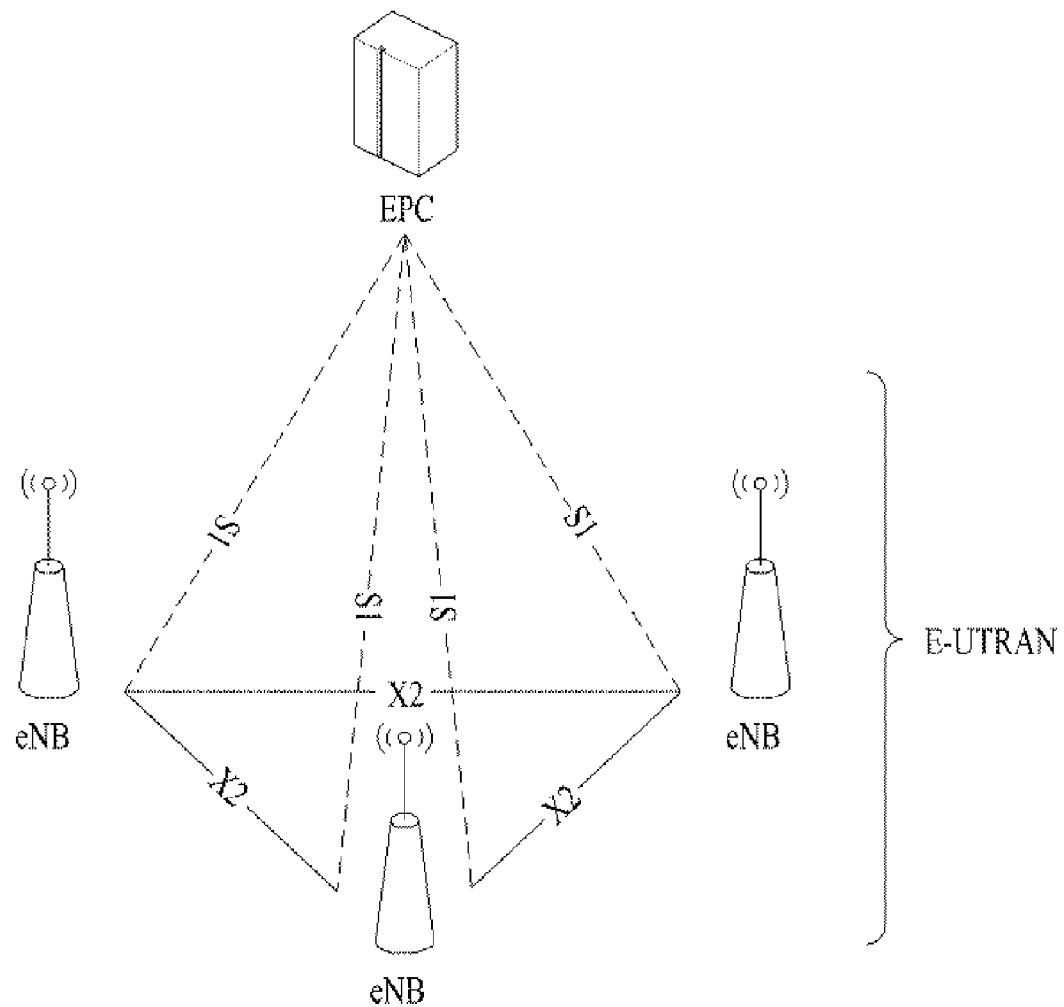
FIG. 2 conceptually illustrates the configuration of an Evolved Universal Terrestrial Radio Access Network (E-UTRAN)

FIG. 2 conceptually illustrates the configuration of an Evolved Universal Terrestrial Radio Access Network (E-UTRAN). E-UTRAN is an evolution of the legacy UTRAN system. The E-UTRAN includes evolved Node Bs (eNode Bs or eNBs) which are connected to each other via an X2 interface. A cell is connected to a User Equipment (UE) via a radio interface and to an Evolved Packet Core (EPC) via an Si interface.

The EPC includes a Mobility Management Entity (MME), a Serving GateWay (S-GW), and a Packet Data Network-GateWay (PDN-GW). The MME has information about connections and capabilities of UEs, mainly for use in managing the mobility of the UEs. The S-GW is a gateway having the E-UTRAN as an end point, and the PDN-GW is a gateway having a PDN as an end point.

Figure 3:
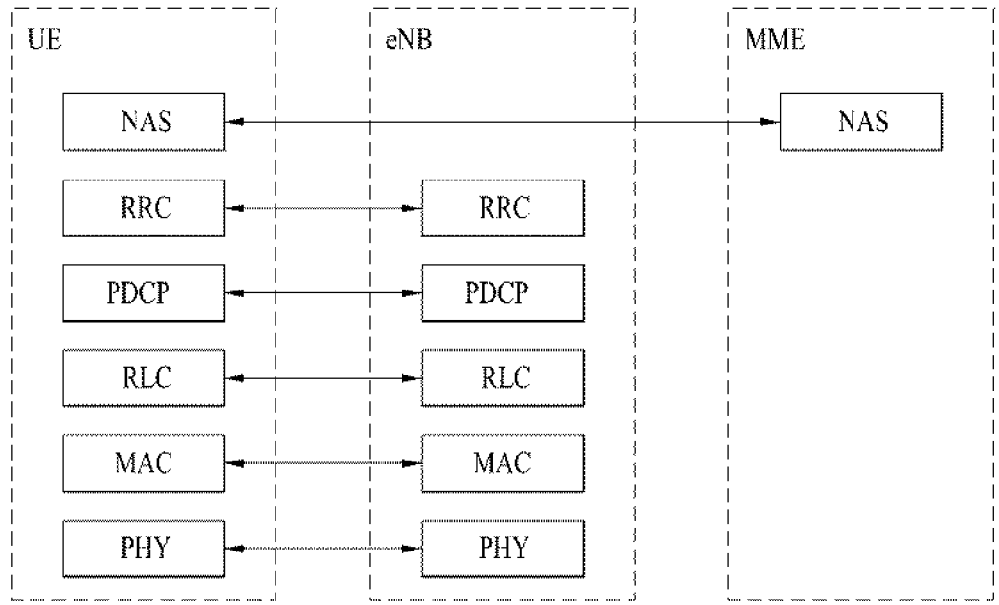
FIG. 3 illustrates a control-plane protocol stack and a user-plane protocol stack in a radio interface protocol architecture conforming to a 3rd Generation Partnership Project (3GPP) radio access network standard between a User Equipment (UE) and the E-UTRAN.
Figure 3:
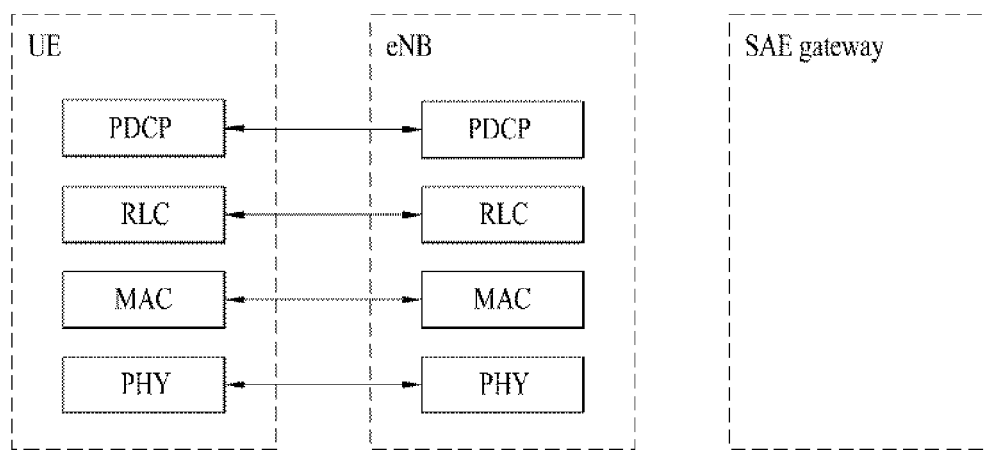

FIG. 3 illustrates control-plane and user-plane protocol stacks in a radio interface protocol architecture conforming to a 3GPP wireless access network standard between a UE and an E-UTRAN. The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, the Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for downlink and in Single Carrier Frequency Division Multiple Access (SC-FDMA) for uplink.

The MAC layer, the Radio Link Control (RLC) layer, and the Packet Data Convergence Protocol (PDCP) layer exist at Layer 2 (L2). The MAC layer at L2 maps various logical channels to transport channels and multiplexes logical channels by mapping a plurality of logical channels to one transport channel. The MAC layer is connected to its higher layer, the RLC layer via logical channels. The logical channels are divided largely into control channels carrying control-plane information and traffic channels carrying user-plane information according to the types of information transmitted on the logical channels.

The RLC layer at L2 controls the size of data received from a higher layer by segmenting and concatenating the data so that the data is suitable for transmission via a radio link at a lower layer. In addition, the RLC layer provides three operation modes, Transparent Mode (TM), Unacknowledged Mode (UM), and Acknowledged Mode (AM) in order to ensure various Quality of Service (QoS) levels required for Radio Bearers (RBs). Especially, an AM RLC takes charge of retransmission by Automatic Repeat reQuest (ARQ), for reliable data transmission.

The PDCP layer at L2 performs header compression to reduce the amount of relatively large unnecessary control information and thus efficiently transmit Internet Protocol (IP) packets such as IP version 4 (IPv4) or IP version 6 (IPv6) packets via a radio link with a narrow bandwidth. As a consequence, the header of data carries only necessary information, thereby increasing the transmission efficiency of a radio link. In the LTE system, the PDCP layer also performs a security function. The security function includes ciphering for preventing a third party from eavesdropping data and integrity protection for preventing a third party from manipulating data.

As described above, the PDCP layer performs a number of functions including header compression, ciphering, integrity protection, maintenance of PDCP Sequence Numbers (SNs), etc. These functions are selectively performed according to the type of an RB.

The Radio Resource Control (RRC) layer at Layer 3 (or L3) is defined only on the control plane. The RRC layer controls logical channels, transport channels, and physical channels in relation to configuration, reconfiguration, and release of RBs. An RB refers to a service provided at L2, for data transmission between a UE and the E-UTRAN. For this purpose, the RRC layers of the UE and the E-UTRAN exchange RRC messages with each other.

RBs are categorized largely into Signaling RBs (SRBs) and Data RBs (DRBs). An SRB delivers an RRC message on the control plane and a DRB delivers user data on the user plane. DRBs may be further divided into UM DRBs using a UM RLC and AM DRBs using an AM RLC according to the operation mode of a used RLC.

RRC states of a UE and how an RRC connection is established will be described below. If an RRC connection has been established between the RRC layers of the UE and the E-UTRAN, the UE is in RRC_CONNECTED state. Otherwise, the UE is in RRC_IDLE state.

The E-UTRAN may effectively control UEs because it can determine the presence of RRC_CONNECTED UEs on a cell basis. However, the E-UTRAN cannot find out RRC_IDLE UEs on a cell basis and thus a CN manages RRC_IDLE UEs on a Tracking Area (TA) basis. A TA is an area unit larger than a cell. That is, if an RRC_IDLE UE wants to receive a service like voice or data service from a cell, it should transition to the RRC_CONNECTED state.

Especially, when a user powers on a UE, the UE searches for a suitable cell and then stays in the RRC_IDLE state. Only when the RRC_IDLE UE needs to establish an RRC connection, the RRL_IDLE UE transitions to the RRC_CONNECTED state by performing an RRC connection establishment procedure. In the case where uplink data transmission is needed for a reason such as a call attempt from a user, or a response message to a paging message received from the E-UTRAN is to be transmitted, an RRC connection needs to be established.

The Non-Access Stratum (NAS) layer above the RRC layer performs functions such as session management, mobility management, etc. For management of UE mobility at the NAS layer, two states are defined, EPS Mobility Management (EMM)-REGISTERED and EMM-UNREGISTERED. These two states are applied to UEs and an MME. A UE is initially in the EMM-UNREGISTERED state. To access the network, the UE registers to the network by an initial attachment procedure. If the attachment procedure is successful, the UE and the MME are placed in the EMM-REGISTERED state.

For management of a signaling connection between a UE and the EPC at the NAS layer, two states are defined, EPS Connection Management (ECM) IDLE and ECM_CONNECTED. These two states are applied to UEs and the MME. If an ECM_IDLE UE establishes an RRC connection with the E-UTRAN, the UE is placed in the ECM_CONNECTED state. When an ECM_IDLE MME establishes an S1 connection with the E-UTRAN, it is placed in the ECM_CONNECTED state.

When a UE is in the ECM_IDLE state, the E-UTRAN does not have a context related to the UE. Thus, the ECM_IDLE UE performs a UE-based mobility procedure such as cell selection or cell reselection without the need of receiving a command from the E-UTRAN. On the other hand, if the UE is in the ECM_CONNECTED state, its mobility is managed according to a command from the E-UTRAN. When the ECM_IDLE UE moves to a location other than a location known to the E-UTRAN, the UE notifies the E-UTRAN of its location by a TA update procedure.

In the LTE system, a cell covered by an eNB is set to one of the bandwidths of 1.25, 2.5, 5, 10, 15, and 20 MHz and provides downlink or uplink transmission service to a plurality of UEs in the bandwidth. Different cells may be set to different bandwidths.

Downlink transport channels used to deliver data from the E-UTRAN to UEs include a Broadcast CHannel (BCH) carrying system information, a Paging CHannel (PCH) carrying a paging message, and a Shared CHannel (SCH) carrying user traffic or a control message. Downlink multicast traffic or control messages or downlink broadcast traffic or control messages may be transmitted on a downlink SCH or a separately defined downlink Multicast CHannel (MCH).

Uplink transport channels used to deliver data from a UE to the E-UTRAN include a Random Access CHannel (RACH) carrying an initial control message and an uplink SCH carrying user traffic or a control message. Logical channels that are defined above transport channels and mapped to the transport channels include a Broadcast Control CHannel (BCCH), a Paging Control CHannel (PCCH), a Common Control CHannel (CCCH), a Multicast Control CHannel (MCCH), and a Multicast Traffic CHannel (MTCH).

Figure 4:
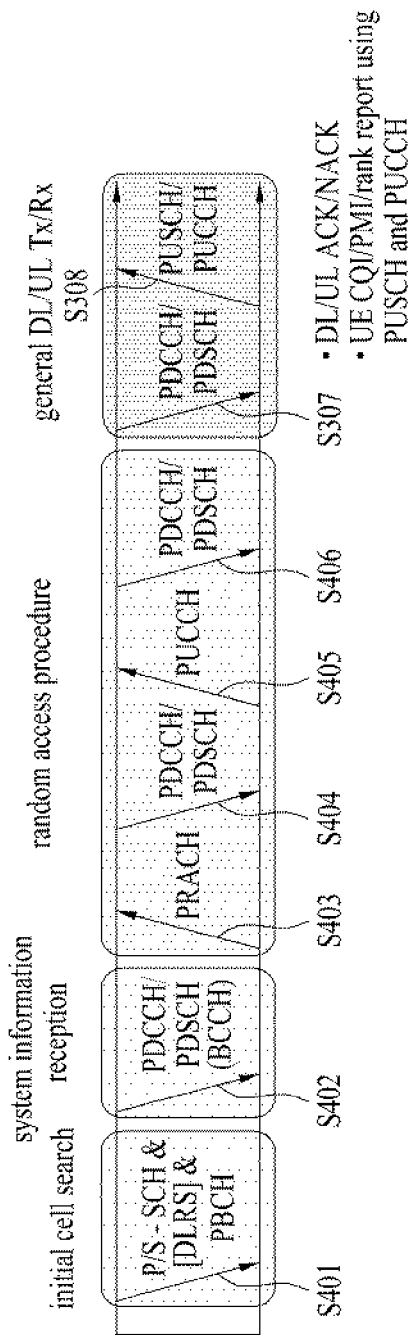
FIG. 4 illustrates physical channels and a general signal transmission method using the physical channels in a 3GPP system.

FIG. 4 illustrates physical channels and a general method for transmitting signals on the physical channels in the 3GPP system.

Referring to FIG. 4, when a UE is powered on or enters a new cell, the UE performs initial cell search (S401). The initial cell search involves acquisition of synchronization to an eNB. Specifically, the UE synchronizes its timing to the eNB and acquires a cell Identifier (ID) and other information by receiving a Primary Synchronization CHannel (P-SCH) and a Secondary Synchronization CHannel (S-SCH) from the eNB. Then the UE may acquire information broadcast in the cell by receiving a Physical Broadcast CHannel (PBCH) from the eNB. During the initial cell search, the UE may monitor a downlink channel state by receiving a DownLink Reference Signal (DL RS).

After the initial cell search, the UE may acquire detailed system information by receiving a Physical Downlink Control CHannel (PDCCH) and receiving a Physical Downlink Shared CHannel (PDSCH) based on information included in the PDCCH (S402).

If the UE initially accesses the eNB or has no radio resource for signal transmission, the UE may perform a random access procedure with the eNB (S403 to S406). In the random access procedure, the UE may transmit a predetermined sequence as a preamble on a Physical Random Access CHannel (PRACH) (S403) and receive a response message to the preamble on a PDCCH and a PDSCH associated with the PDCCH (S404). In case of a contention-based random access procedure, the UE may additionally perform a contention resolution procedure.

After the above procedure, the UE may receive a PDCCH and/or a PDSCH from the eNB (S407) and transmit a Physical Uplink Shared CHannel (PUSCH) and/or a Physical Uplink Control CHannel (PUCCH) to the eNB (S408), which is a general downlink and uplink signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the uplink or receives from the eNB on the downlink includes a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Now a description will be given of an operation for transmitting and receiving an instant message in the LTE system.

Figure 5:
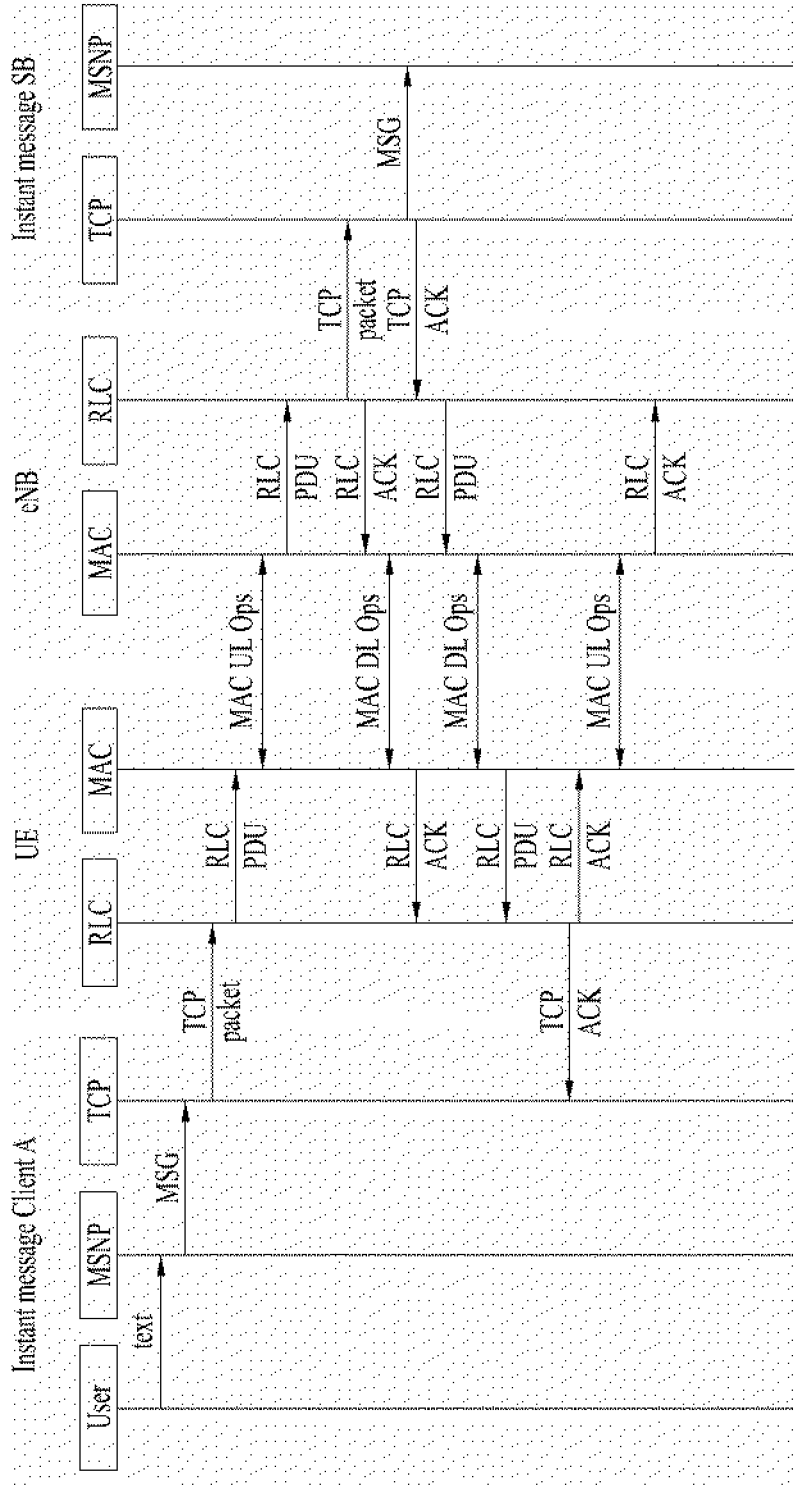
FIGS. 5 and 6 illustrate a procedure for exchanging an instant message between entities in the LTE system.
Figure 6:
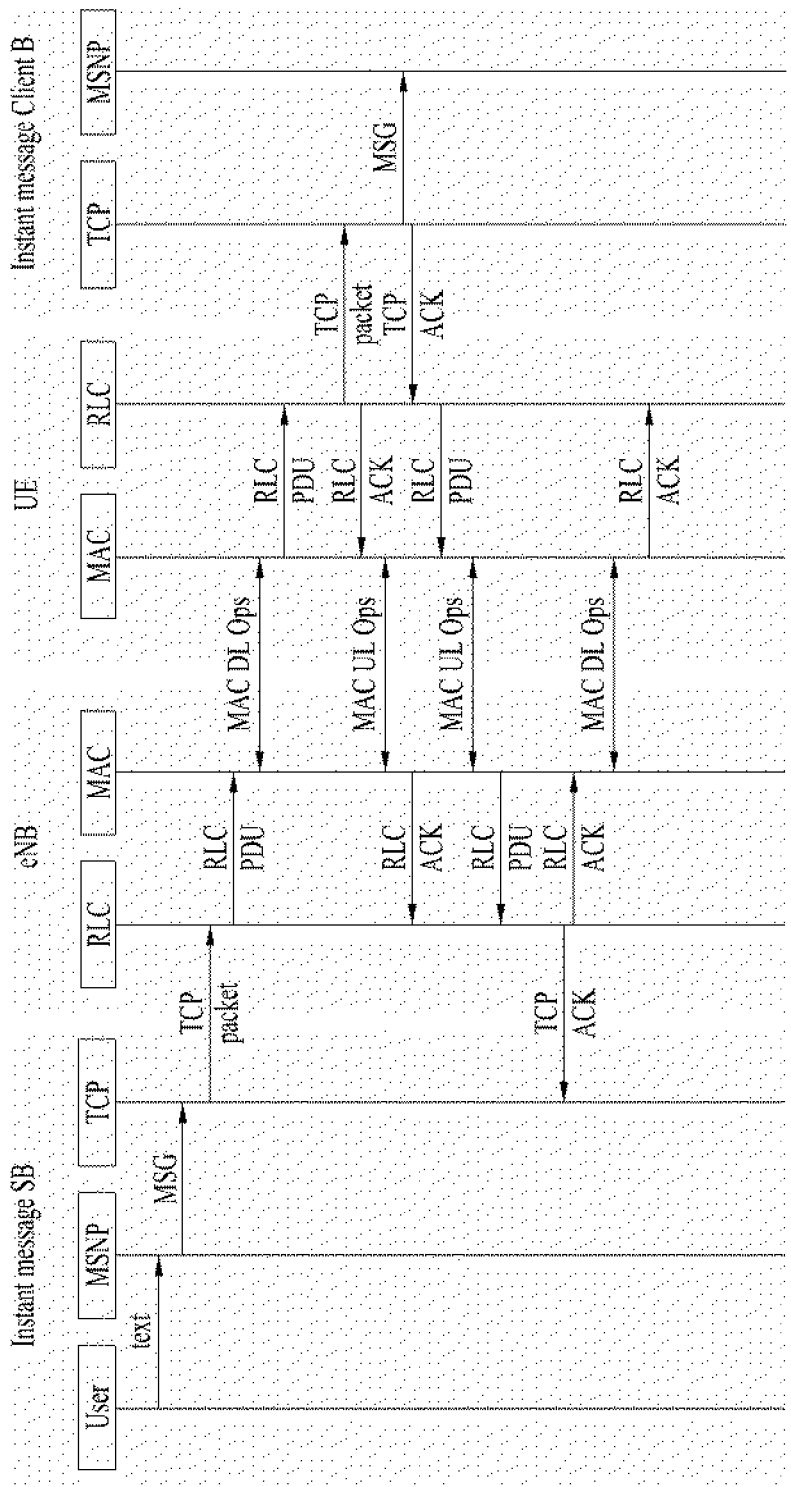

FIGS. 5 and 6 illustrate a procedure for exchanging an instant message between entities in the LTE system. Specifically, FIG. 5 illustrates a procedure for transmitting an instant message to a message Switching Board (SB) of a network by an instant message application of a UE and FIG. 6 illustrates a procedure for receiving an instant message from the message SB of the network by the instant message application of the UE.

Referring to FIGS. 5 and 6, to transmit or receive a single instant message, a total of four MAC operations, that is, two MAC UL operations and two MAC DL operations are performed.

Figure 7:
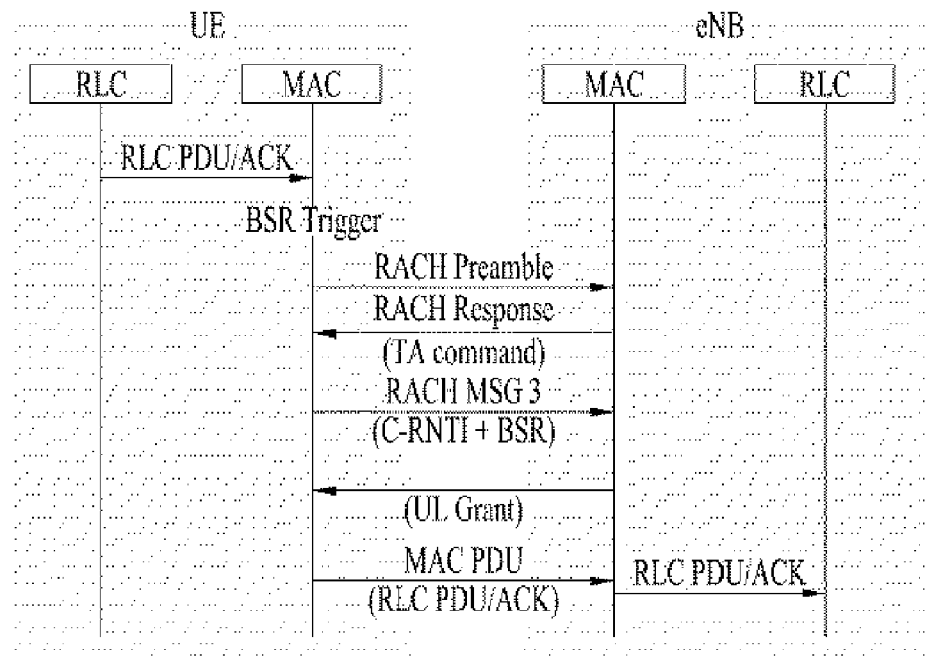
FIGS. 7 and 8 are diagrams illustrating signal flows for Medium Access Control (MAC) uplink operations.
Figure 8:
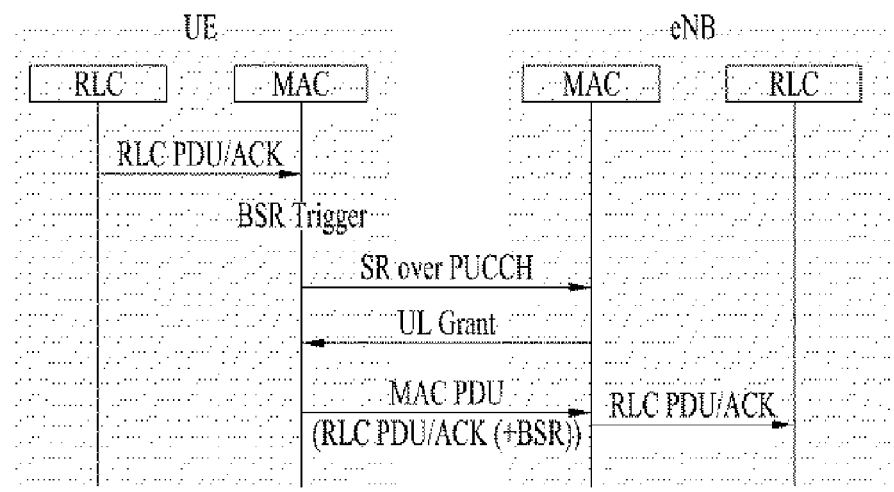

FIGS. 7 and 8 are diagrams illustrating signal flows for MAC UL operations. Specifically, FIGS. 7 and 8 illustrate MAC operations for transmitting an RLC ACK or an RLC PDU from a UE to a network.

FIG. 7 is based on the assumption that the UE has not acquired uplink synchronization or no Scheduling Request (SR) resources have been configured for the UE. In this case, the UE may transmit an RLC ACK or an RLC PDU to the network only after performing a random access procedure for transmitting uplink data, as illustrated in FIG. 7.

FIG. 8 is based on the assumption that the UE has acquired uplink synchronization or SR resources have been configured on a PUCCH for the UE. In this case, the UE may not perform operations such as transmission of an RACH preamble and reception of a response to the RACH preamble by transmitting an SR on the PUCCH.

Figure 9:
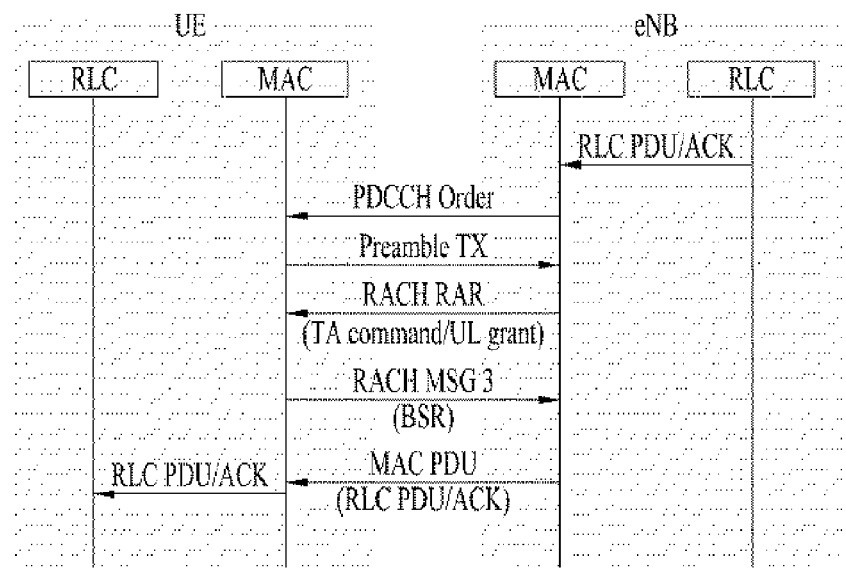
FIGS. 9 and 10 are detailed diagrams illustrating signal flows for MAC downlink operations.
Figure 10:
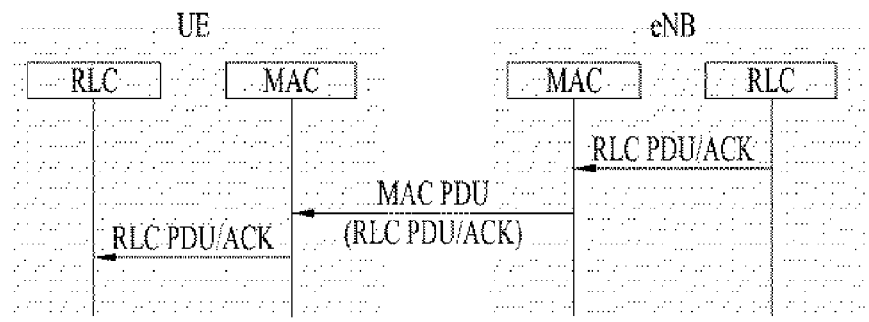

FIGS. 9 and 10 are detailed diagrams illustrating signal flows for MAC DL operations. Specifically, FIGS. 9 and 10 illustrate MAC operations for transmitting an RLC ACK or an RLC PDU from the network to the UE.

FIG. 9 is based on the assumption that the UE has not acquired uplink synchronization. In this case, when the network is to transmit data to the UE, the network should first control the UE to acquire uplink synchronization by a random access procedure. Therefore, the network transmits a PDCCH Order to the UE so that the UE may perform the random access procedure as illustrated in FIG. 8. Only after the UE acquires uplink synchronization by the random access procedure, the network can transmit data to the UE.

FIG. 10 is based on the assumption that the UE has acquired uplink synchronization. In this case, the network can transmit data to the UE immediately.

As noted from FIGS. 5 to 10, many MAC operations and RLC operations are needed for transmitting a single message. That is, the current LTE protocols do not consider the operation characteristics of each higher-layer application and as a result, many operations are redundantly performed at the lower PDCP, RLC, and MAC layers.

The present invention is intended to solve the above problem. More particularly, the present invention provides a method for reducing unnecessary operations of each LTE protocol layer and efficiently using radio resources by enabling the LTE protocol layer to operate effectively, taking into account the characteristics of data generated from each application.

<Embodiment 1>

In accordance with an embodiment, even though a buffer status report is triggered at the MAC layer of a UE, the buffer status report is transmitted to a network after a predetermined time delay, rather than it is transmitted immediately to the network. That is, a delayed buffer status report is transmitted to the network. As a result, an RLC ACK and an RLC PDU may be transmitted together.

Specifically, the network may indicate use of a delayed buffer status report function to the UE. In this case, the network may command delayed transmission of only a buffer status report message triggered for data of a specific bearer or a specific logical channel, or delayed transmission of a buffer status report message for data of all bearers or all logical channels.

For convenience' sake of description, it is assumed herein that the network commands delayed transmission of only a buffer status report message triggered for data of a specific bearer or logical channel.

Figure 11:
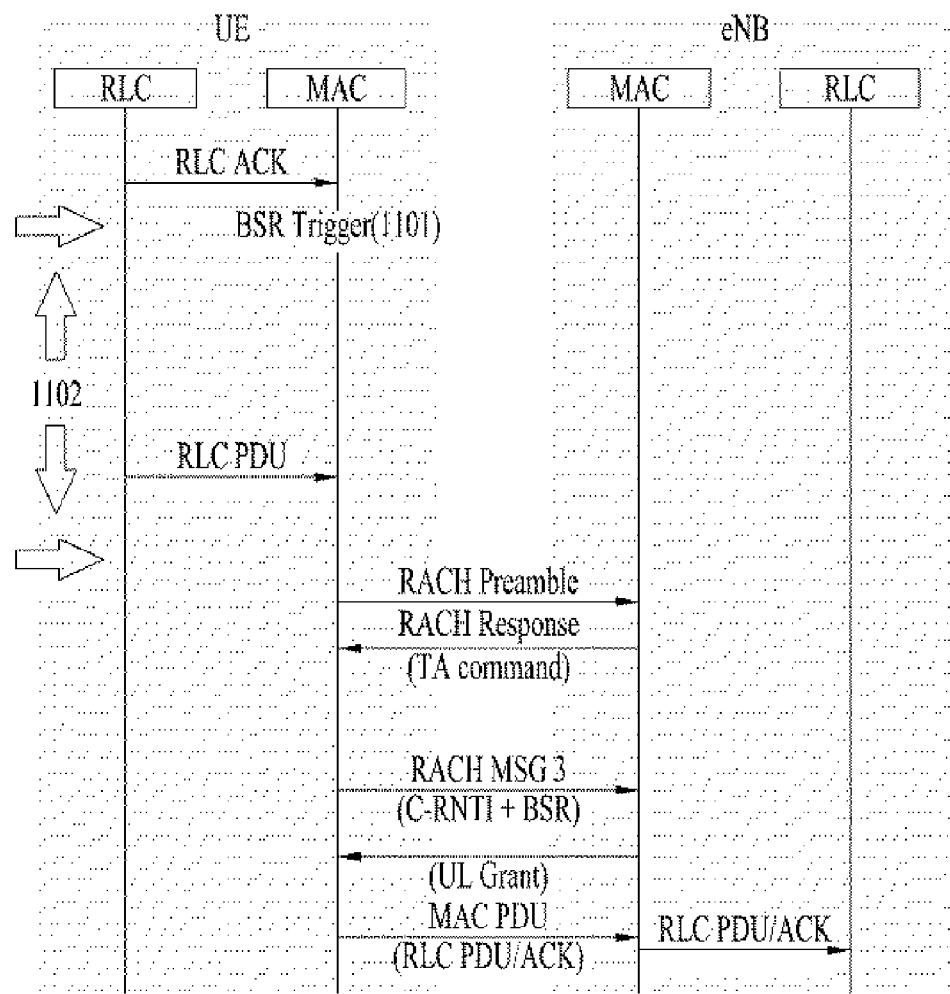
FIGS. 11 and 12 illustrate examples in which a delayed buffer status report function is applied according to an embodiment of the present invention.
Figure 12:
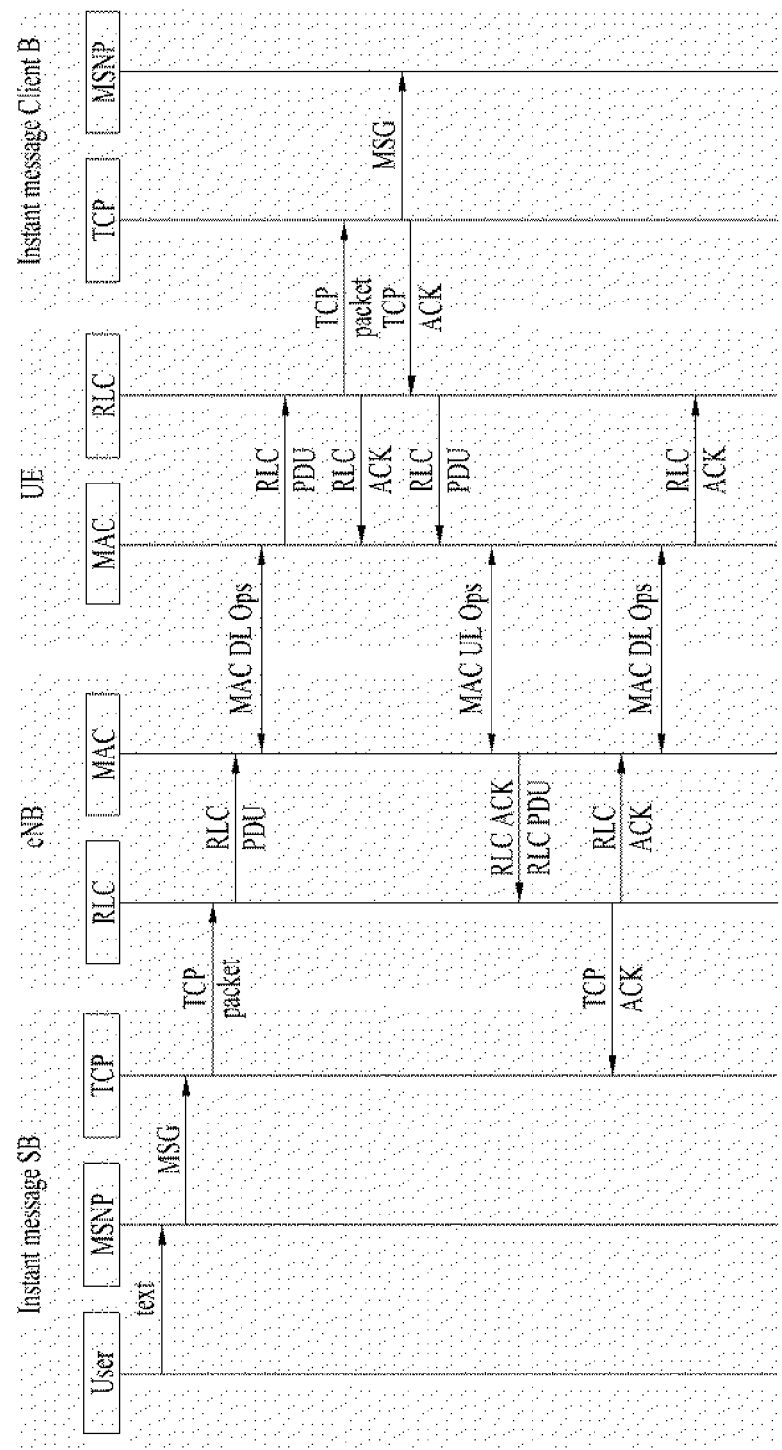

FIGS. 11 and 12 illustrate examples in which the delayed buffer status report function is applied according to an embodiment of the present invention.

FIG. 11 illustrates an exemplary signal flow for a MAC UL operation according to an embodiment of the present invention. Especially, FIG. 11 is based on the assumption that the UE has not acquired uplink synchronization or no SR resources have been configured for the UE.

Referring to FIG. 11, even though a buffer status report is triggered at the MAC layer of the UE (1101), the UE transmits the buffer status report after as much a delay time as a timer value 1102. The timer value is preferably a time period for which an RLC PDU reaches a buffer of the MAC layer while a timer is running. The use of the delayed buffer status report may result in simultaneous transmission of an RLC ACK and an RLC PDU.

FIG. 12 illustrates an exemplary procedure for receiving an instant message from the message SB of the network by the instant message application of the UE according to an embodiment of the present invention.

Referring to FIG. 12, as an RLC ACK and an RLC PDU are transmitted together using a delayed buffer status report as illustrated in FIG. 11, two MAC UL operations are reduced to one MAC UL operation.

In the case where the delayed buffer status report function is activated, when a buffer status report is triggered due to arrival of data at a specific bearer or logical channel, the UE transmits a buffer status report message to the network after a predetermined time delay using a timer, rather than immediately.

It may be further contemplated as another method that upon arrival of data at a specific bearer or logical channel, the UE activates a timer and upon expiration of the timer, the UE triggers a buffer status report and transmits the buffer status report to the network.

It may be further contemplated as a further method that when a buffer status report is triggered upon arrival of data at a specific bearer or logical channel, the UE transmits an SR signal on a PUCCH by an SR procedure or performs a random access procedure after a predetermined time delay using a timer. That is, the UE may delay the SR procedure or the random access procedure.

<Embodiment 2>

In accordance with another embodiment of the present invention, in the presence of feedback information to be transmitted to a peer RLC entity, an RLC entity transmits the feedback information after a predetermined time delay, rather than immediately. That is, an RLC ACK is transmitted after a time delay.

For example, upon generation of an RLC Status PDU to be transmitted to an RLC entity of the network, an RLC entity of a UE transmits the RLC Status PDU to the network after a predetermined time delay using a timer, rather than immediately. The RLC Status PDU is a data unit including an ACK/NACK for a received downlink RLC PDU or a data unit including control information to be transmitted to the peer RLC entity. A MAC entity considers that the RLC Status PDU has not arrived at a buffer until a predetermined time elapses.

Upon generation of general data to be transmitted to the RLC entity of the network in addition to the RLC Status PDU, the RLC entity of the UE may decide to transmit the RLC Status PDU immediately.

Preferably, delayed transmission of an RLC Status PDU from the RLC entity may be limited to an RLC Status PDU including an ACK/NACK for an RLC PDU.

To support the operation of the RLC entity, a higher layer may notify the RLC layer whether an RLC Status PDU is to be transmitted after a time delay.

<Embodiment 3>

In accordance with a third embodiment of the present invention, a method for efficiently allocating and deallocating radio resources is provided in order to prevent a decrease in utilization of radio resources which have already been allocated to a UE but have not been used often.

For instance, the network transmits a plurality of pieces of radio resource configuration information in a System Information Block (SUB) or an RRC message. Preferably, the network assigns serial numbers to the plurality of pieces of radio resource configuration information and indicates the serial numbers to the UE. For example, the network assigns serial numbers like 1, 2, 3, . . . to PUCCH resources for an SR procedure and indicates the serial numbers to the UE.

Then the network notifies the UE of specific radio resources to be used from among configured radio resources. Preferably, the network notifies the UE of the serial number of specific radio resources allocated to the UE and the UE uses the radio resources indicated by the serial number.

When indicating use of the specific radio resources to the UE, the network uses MAC signaling. Preferably, the network transmits information about the specific radio resources to the UE by means of a MAC control element. The MAC control element includes the serial number of the specific radio resources allocated to the UE. In addition, if a predetermined condition is satisfied, the radio resources allocated to the UE are released. That is, if the specific condition is satisfied, the UE is not allowed to use the specific radio resources allocated to it any longer.

The predetermined condition may be expiration of a timer. For example, once specific radio resources are allocated to the UE, the UE activates a specific timer. Upon expiration of the timer, the UE releases the allocated radio resources and does not use them any longer. Meanwhile, the predetermined condition may be reception of a resource deallocation command from the network at the UE. For example, upon receipt of a resource deallocation message from the network while the UE is using allocated specific radio resources, the UE releases the radio resources and does not use them any longer.

Preferably, the network may directly indicate specific radio resources temporarily allocated to the UE without using a serial number, whenever needed.

In one of methods for implementing the present invention, the network may allocate radio resources directly to the UE by MAC signaling. For example, when the UE performs a random access procedure, the network may indicate PUCCH resources allocated for an SR to the UE by a Random Access Response message. In this case, when the UE should perform an SR procedure, the UE may use the allocated radio resources. The network may additionally notify the UE when to release the radio resources. Then, the UE stops using the radio resources allocated by MAC signaling a predetermined time later.

The UE may release the allocated radio resources a predetermined time after the last time of using the specific radio resources, not a predetermined time after the allocation time of the specific radio resources.

Preferably, the network may indicate the predetermined time or timer information to the UE by an SIB. In addition, the network may indicate each of the afore-mentioned predetermined times to each UE by an RRC message, MAC signaling, or a combination of an SIB, an RRC message, and a MAC message.

<Embodiment 4>

If a UE stays long in RRC_CONNECTED state, the UE should transmit a measurement report message continuously to the network. If the UE fails to transmit the measurement report message to the network at an appropriate time, the network cannot transmit a handover message to the UE at an appropriate timing and thus a connection is released from the network. Meanwhile, upon generation of transmission data in RRC_IDLE state, the UE should perform a procedure for transitioning to the RRC_CONNECTED state each time. As a consequence, resources within a cell are wasted and the battery of the UE is consumed.

Accordingly, the present invention provides a method for reducing signaling messages exchanged between a UE and a network and enabling the UE to transition to a state in which data transmission and reception is effective, upon generation of data, by effectively managing the states of the UE.

Specifically, upon receipt of an RRC mobility command from the network in RRC_CONNECTED state, the UE operates in a similar manner to in RRC_IDLE state. Then when data to be transmitted to the network is generated or the network indicates the presence of data to be transmitted to the UE by a paging message, the UE performs an RRC connection reestablishment procedure.

Conventionally, when an RRC_CONNECTED UE cannot perform handover to a cell indicated by the network (handover failure) or the RRC_CONNECTED UE reselects a cell due to poor state of a signal from a connected cell for a predetermined time or longer (radio link failure), the RRC_CONNECTED UE performs an RRC connection reestablishment procedure. Herein, the UE freely selects a cell to camp on. That is, the RRC_CONNECTED UE keeps connected to a cell indicated by the network except for the above cases, i.e. handover failure or radio link failure, rather than it selects a cell on its own.

However, upon receipt of an RRC mobility command from the network in RRC_CONNECTED state, a UE determines a cell to camp on for itself even though handover failure or radio link failure does not occur in a fourth embodiment of the present invention.

Specifically, upon receipt of a message like an RRC mobility command from the network in RRC_CONNECTED state, a UE transitions to a temporary state called RRC temp state. The RRC temp state refers to a state in which an eNB has a context of a UE but the UE can select a cell on its own. On the other hand, the eNB has the context of the UE and the UE can select a cell according to a command from the eNB in the RRC_CONNECTED state. In the RRC_IDLE state, the eNB does not have the context of the UE and the UE can select a cell on its own.

In the RRC temp state, the UE determines a cell to camp on by cell reselection as in the RRC_IDLE state. Even though its serving cell is changed, the UE does not perform an RRC connection reestablishment procedure. Subsequently, upon generation of data to be transmitted to the network or data to be received from the network, the UE performs the RRC connection reestablishment procedure. In addition, the UE maintains bearer configuration information set in the RRC_CONNECTED state, in the RRC temp state.

When the UE enters a cell that is not allowed for the UE in the RRC temp state, the UE transitions to the RRC_IDLE state. That is, the network may transmit to the UE information about cells with which the UE is allowed to perform the RRC connection reestablishment procedure during the above operation. In this case, the RRC maintains the RRC temp state only in an allowed cell and then performs the RRC connection reestablishment procedure, when needed. Cells that are not allowed for the UE include a cell within a Public Land Mobile Network (PLMN) other than a Home-PLMN (HPLMN), a cell within a PLMN other than the PLMN of a cell from which a UE receives an RRC mobility command, and a cell that is not included in a list of cells allowed by the network.

Figure 13:
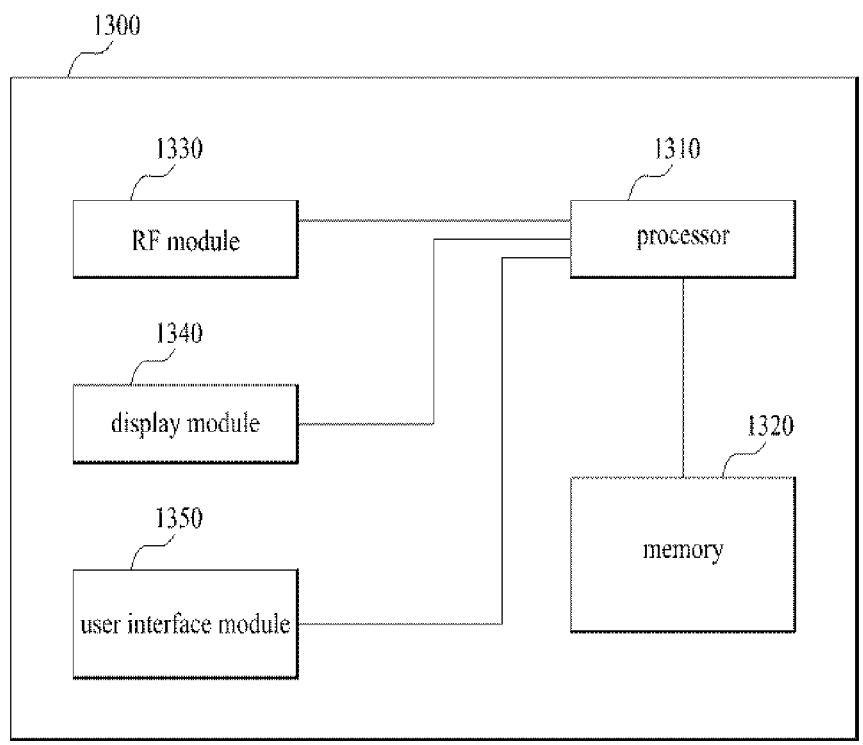
FIG. 13 is a block diagram of a communication apparatus according to an embodiment of the present invention.

FIG. 13 is a block diagram of a communication apparatus according to an embodiment of the present invention.

Referring to FIG. 13, a communication apparatus 1300 includes a processor 1310, a memory 1320, a Radio Frequency (RF) module 1330, a display module 1340, and a user interface module 1350.

For the convenience's sake of description, the communication apparatus 1300 is shown as including the components in FIG. 13. Thus, some modules may be omitted from or added to the communication apparatus 1300, when needed. In addition, a module in the communication apparatus 1300 may be configured into separate modules. The processor 1310 is configured to perform operations according to the embodiments of the present invention described before with reference to FIGS. 1 to 12.

The memory 1320 is connected to the processor 1310 and stores an Operating System (OS), applications, program code, and data. The RF module 1330 is connected to the processor 1310 and functions to convert a baseband signal to an RF signal or an RF signal to a baseband signal. For this purpose, the RF module 1330 performs analog conversion, amplification, filtering, and frequency upconversion, or performs these operations reversely. The display module 1340 is connected to the processor 1310 and displays various types of information. The display module 1340 may be configured with, but not limited to, known components such as a Liquid Crystal Display (LCD), a Light Emitting Diode LED), and an Organic Light Emitting Diode (OLED). The user interface module 1350 is connected to the processor 1310 and may be configured using known user interfaces such as a keypad, a touch screen, etc. in combination.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term, fixed station, Node B, eNode B (eNB), access point, etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for transmitting and receiving a signal to and from a network at a UE in a wireless communication system have been described in the context of a 3GPP LTE system, they are applicable to other various wireless communication systems.

The invention claimed is:

1. A method for transmitting a signal to a transmitter at a receiver in a wireless communication system, the method comprising:
   receiving first information to be transmitted to the transmitter from a higher layer and starting a first timer;
   receiving second information to be transmitted to the transmitter from the higher layer;
   transmitting a resource allocation request message to the transmitter, for transmitting the first and second information, upon expiration of the first timer;
   receiving radio resource information for transmitting the first and second information, in response to the resource allocation request message from the transmitter;
   transmitting the first and second information using an allocated radio resource indicated by the radio resource information;
   starting or restarting a second timer; and
   releasing the allocated radio resource upon expiration of the second timer.

2. The method according to claim 1, further comprising receiving information about the first timer from the transmitter.

3. The method according to claim 1, wherein the resource allocation request message is a buffer status report message.

4. The method according to claim 1, wherein the resource allocation request message is a scheduling request message transmitted on an uplink physical control channel.

5. The method according to claim 1, wherein the first and second information is related to a predetermined radio bearer or a predetermined logical channel.

6. The method according to claim 5, further comprising receiving, from the transmitter, information about the predetermined radio bearer or the predetermined logical channel.

7. The method according to claim 1, wherein:
   the first information is a Radio Link Control (RLC) status data unit; and
   the second information is an RLC data unit.

8. The method according to claim 7, wherein the RLC status data unit includes ACKnowledgment/Negative ACKnowledgment (ACK/NACK) information for an RLC data unit received from the transmitter.

9. The method according to 8, further comprising, if the RLC status data unit is not ACK/NACK information, transmitting the RLC status data unit immediately, regardless of the expiration of the first timer.

10. The method according to claim 1, wherein the first information and the second information are transmitted together to the transmitter.

11. The method according to claim 1, wherein the first information and the second information are transmitted separately to the transmitter.

12. The method according to claim 1, wherein the second timer is started when the allocated radio resource indicated by the radio resource information is allocated to the receiver.

13. The method according to claim 1, wherein the second timer is started or restarted when the receiver stops using the allocated radio resource.

14. The method according to claim 1, wherein the radio resource information is received through System Information Block, Radio Resource Control message, or Medium Access Control signaling.

* * * * *